US012782499B2

(12) United States Patent
Chen

(10) Patent No.: US 12,782,499 B2
(45) Date of Patent: Nov. 3, 2026

(54) METHOD FOR RECONSTRUCTING A SPECTRUM FROM A RADAR SIGNAL DISRUPTED BY INTERFERENCE

(71) Applicant: HELLA GmbH & Co. KGaA, Lippstadt (DE)

(72) Inventor: Shengyi Chen, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 270 days.

(21) Appl. No.: 18/614,737

(22) Filed: Mar. 24, 2024

(65) Prior Publication Data

US 2024/0230833 A1 Jul. 11, 2024

Related U.S. Application Data

(63) Continuation of application No. PCT/EP2022/074547, filed on Sep. 5, 2022.

(30) Foreign Application Priority Data

Sep. 24, 2021 (DE) ..................... 10 2021 124 795.0

(51) Int. Cl.
*G01S 7/02* (2006.01)
*G01S 7/35* (2006.01)

(52) U.S. Cl.
CPC ............ *G01S 7/0232* (2021.05); *G01S 7/354* (2013.01); *G01S 7/356* (2021.05)

(58) Field of Classification Search
CPC ........ G01S 7/0232; G01S 7/356; G01S 7/354; G01S 7/023; G01S 13/343; G01S 13/584; G01S 13/931; G01S 7/35
See application file for complete search history.

(56) References Cited

U.S. PATENT DOCUMENTS 11,175,378 B2 * 11/2021 Amihood ................ G01S 13/44
11,448,752 B2 * 9/2022 Wennersten ............ G01S 7/354
(Continued)

FOREIGN PATENT DOCUMENTS

DE 102018124688 A1 4/2020
JP 2021067461 A * 4/2021

OTHER PUBLICATIONS

JP2021067461A_Description_20260106_1459.pdf—translation (Year: 2021).*

(Continued)

*Primary Examiner* — Yonghong Li
(74) *Attorney, Agent, or Firm* — Muncy, Geissler, Olds & Lowe, P.C.

(57) ABSTRACT

A method for reconstructing a two-dimensional range-Doppler spectrum from a signal of a radar sensor disrupted by interference for a vehicle. A transmission signal is emitted and a received signal is received that correlates to the transmission signal. The received signal is filtered and sampled. A discrete beat signal is determined from the filtered and sampled received signal. Disrupted sampling values are detected in the discrete beat signal. A binary mask matrix is generated for marking disruption-free sampling values and for masking disrupted sampling values in the discrete beat signal. The spectrum is reconstructed from disruption-free sampling values of the discrete beat signal with the aid of a transmission function. Remaining value updates are monitored during the reconstruction of the spectrum with the aid of the mask matrix.

19 Claims, 7 Drawing Sheets

(56) References Cited

U.S. PATENT DOCUMENTS

| | | | | |
|---|---|---|---|---|
| 11,885,903 | B2 * | 1/2024 | Meissner | G01S 7/023 |
| 2017/0131394 | A1 * | 5/2017 | Roger | G01S 13/343 |
| 2018/0356495 | A1 | 12/2018 | Moss et al. | |
| 2020/0341109 | A1 | 10/2020 | Meissner et al. | |

OTHER PUBLICATIONS

E. Mason, B. Yonel and B. Yazici, "Deep learning for radar," 2017 IEEE Radar Conference (RadarConf), Seattle, WA, USA, 2017, pp. 1703-1708, doi: 10.1109/Radar.2017.7944481 (Year: 2017).*

International Search Report dated Dec. 6, 2022 in corresponding application PCT/EP2022/074547.

Wikibrief. "Komprimierte Erfassung" May 12, 2021, pp. 1-10, XP093000932.

Chen, S. et al: „Automotive Radar Interference Reduction Based on Sparse Bayesian Learning IEEE Radar Conference, 2020.

* cited by examiner

METHOD FOR RECONSTRUCTING A SPECTRUM FROM A RADAR SIGNAL DISRUPTED BY INTERFERENCE

This nonprovisional application is a continuation of International Application No. PCT/EP2022/074547, which was filed on Sep. 5, 2022, and which claims priority to German Patent Application No. 10 2021 124 795.0, which was filed in Germany on Sep. 24, 2021, and which are both herein incorporated by reference.

BACKGROUND OF THE INVENTION

Field of the Invention

The present invention relates to a method for reconstructing a spectrum, in particular a preferably two-dimensional range-Doppler spectrum, from a signal of a radar sensor disrupted by interference for a vehicle. The invention also relates to a corresponding radar sensor for a vehicle and a corresponding computer program product.

Description of the Background Art

Radar technology plays an important role in modern vehicles, since it is able to reliably support the functionality of advanced driver assistance systems under nearly all weather conditions. For this reason, the number of vehicles equipped with radar sensors is growing rapidly. The influence of the vehicle radars on each other, or the interference of the radar signals, is increasing, due to the growing density of radar sensors on the road. The functions of the radar sensors may be impaired up to a certain degree by the influence on each other if no countermeasures are taken.

To mitigate disruptive influences in the radar signals resulting from interference, methods for compressed sensing are used (including "compressive sensing," "compressing sampling," or "sparse sampling"). A range-Doppler spectrum may be ascertained with the aid of undistorted sampling values in the discrete beat signal. Known methods for compressed sensing have a high computing complexity, require a high computing power and a long computing time. The direct application of methods for compressed sensing are therefore possible only to a limited extent in radar systems for vehicles.

SUMMARY OF THE INVENTION

It is therefore an object of the present invention to at least partially eliminate the disadvantages described above. In particular, an object of the present invention is to provide a method for reconstructing a spectrum, in particular a preferably two-dimensional range-Doppler spectrum, from a signal of a radar sensor disrupted by interference for a motor vehicle, which is fast, effective, and reliable, which permits a reliable and safe use in radar systems for vehicles, and which improves the functionality of advanced driver assistance systems based on radar technology. The object of the invention is also to provide a corresponding radar sensor for a vehicle and a corresponding computer program product.

The object mentioned above is achieved by a method, by a radar sensor, as well as by a computer program product. Features and details which are described in connection with the different examples and/or aspects of the invention also apply, of course, in connection with the other examples and/or aspects, and vice versa in each case, so that reference always is or may be made interchangeably with respect to the disclosure of the individual specific embodiments and/or aspects.

The object is achieved, in particular, by a method for a vehicle, which is carried out to reconstruct a spectrum, in particular a preferably two-dimensional range-Doppler spectrum, from a signal of a radar sensor disrupted by interference. The reconstruction preferably takes place directly from a discrete beat signal, which is determined by filtering and sampling a received signal of the radar sensor.

The method according to the invention includes the following actions: emitting a transmission signal, in particular by a transmitting unit of the radar sensor, for example, comprising a transmitting antenna; receiving a received signal which correlates to the transmission signal, in particular by a receiving unit of the radar sensor, for example, comprising three, preferably equidistant, receiving antennas; filtering and sampling the received signal, in particular, by a filter unit (for example, comprising a bandpass or low-pass filter) and an analog/digital converter of an electronic unit of the radar sensor; determining an, in particular, two-dimensional, discrete, and preferably normalized beat signal (so-called "2D discrete beat signal") from the filtered and sampled received signal, in particular by a digital processing device of the electronic unit of the radar sensor; detecting disrupted sampling values in the discrete beat signal, in particular, by the digital processing device of the electronic unit of the radar sensor; generating an, in particular, binary mask matrix (which comprises only zeros "0" and ones "1") for marking disruption-free or interference-free sampling values and for masking disrupted sampling values in the discrete beat signal (preferably with the aid of zeros "0" and ones "1" at corresponding positions in the mask matrix), in particular, by the digital processing device of the electronic unit of the radar sensor; reconstructing the spectrum from disruption-free sampling values of the discrete beat signal with the aid of a transmission function (for example, in the form of a transformation matrix, in particular, a two-dimensional, inverse discrete Fourier transform), preferably with the aid of a method for compressed sensing, in particular by the digital processing device of the electronic unit of the radar sensor; and monitoring the remaining value updates during the reconstruction of the spectrum with the aid of the mask matrix, in particular, by the digital processing device of the electronic unit of the radar sensor, wherein, in particular during the monitoring of remaining value updates, the remaining value updates are tracked with the aid of the mask matrix at position of disruption-free sampling values in the discrete beat signal.

With the aid of the invention, methods for compressed sensing may be easily and efficiently implemented for mitigating interference disruptions in the radar sensors in motor vehicles. The method according to the invention may be referred to as a two-dimensional masked residual updating control method (2D MRUC). By using the sparseness (or thin signal population) of the beat signal in the frequency range, the range-Doppler (RD) spectrum may be reconstructed with the aid of undistorted or disruption-free sampling values in the beat signal. In contrast to the other classic methods for compressed sensing, which convert a 2D signal measurement into a 1D signal by vectorization, the proposed method may carry out a 2D signal measurement directly and reconstruct a corresponding spectrum, in particular a 2D range-Doppler spectrum.

The invention recognizes that the microcontrollers of most radar sensors are able to work with reduced latency periods via an accelerator for the FFT processing. However, the known methods for compressed sensing do not use this advantage, due to the necessary vectorization of the beat signal. To use the computational advantage of the FFT processing, the invention proposes a 2D masking in the beat signal. In this way, the size of the transmission function may be fixed, the FFT processing elegantly implemented within the scope of the transmission function and easily integrated into different known solvers for a compressed sensing. In the case of the known methods for compressed sensing, the size of the transmission function, however, depends on the number of interference-free sampling values in the beat signal, which may vary in different interference scenarios.

The invention also recognizes that the dimension or the number of remaining value updates corresponds to the number of disruption-free sampling values in the beat signal. The invention therefore proposes to control the remaining value updates using a mask matrix and to simultaneously fix the size of the transmission function (or the transformation matrix). In other words, the invention proposes to track the remaining value updates with the aid of the mask matrix at exact positions of the disruption-free sampling values in the beat signal. The advantage of a fixed size of the measurement transformation matrix is that the matrix vector multiplications for Fourier transforms may be replaced by the FFT processing or inverse FFT processing (IFFT).

The method may advantageously improve classic method for compressed sensing and make them more efficient during the reconstruction, such as basis tracking, iterative threshold formation, orthogonal matching pursuit (OMP), approximate message passing (AMP), etc. The method may reconstruct the spectrum with a high degree of accuracy, an improved efficiency, and a higher velocity in fractions of a millisecond. The method furthermore shows considerable advantages with respect to reduced calculation complexity.

The efficiency may be improved, in particular, in that the vectorization of the beat signal is avoided. As a result, the dimension (formed by the number of rows and the number of columns) of the transmission function (or the transformation matrix, in particular, the inverse discrete Fourier transformation matrix) may be maintained regardless of the type and position of the disruptions in the discrete beat signal. Due to the fixed dimension of the transmission function, the inverse Fourier transform may also be implemented directly within the scope of the transmission function. Established accelerators for Fourier transforms or for inverse Fourier transforms may thus be used for determining the transmission function. In addition, known solvers may be used for the reconstruction.

It may furthermore be provided that the emission of the transmission signal having multiple frequency ramps (so-called chirps) can take place within a time period, a transmission frequency of the frequency ramps, in particular, being modulated. In this way, the transmission power in the radar sensor may be reduced.

It may furthermore be provided that the received signal can be specific to a distance to an object outside the vehicle, on which the transmission signal is at least partially reflected. In this way, the radar sensor may be used for a distance sensing in an improved manner.

It may moreover be provided that the spectrum is at least two-dimensional, and/or that at least one first dimension of the spectrum can be specific to a distance to the object, and at least one second dimension of the spectrum is specific to a velocity of the object and/or to a relative velocity with respect to the object. In this way, the radar sensor may be used in an improved and expanded manner.

It may also be provided that the discrete beat signal can be at least two-dimensional and preferably normalized, and/or that at least one first dimension of the discrete beat signal is determined by a number of sampling values per frequency ramp in the beat signal, and at least one second dimension of the discrete beat signal is determined by a number of ramps in the transmission signal. In this way, a signal may be provided which may be used in an improved manner for reconstructing the spectrum, in particular, an at least two-dimensional range-Doppler spectrum.

It may additionally be provided that the detection of disrupted sampling values in the discrete beat signal can take place with the aid of a filter for detecting edges and an iterative adaptive threshold value method. By combining the two methods, a detection having an increased accuracy may be provided in an improved manner.

It may advantageously also be provided that the mask matrix can be two-dimensional, and/or that the dimension of the mask matrix is determined according to the dimension of the discrete beat signal in matrix form. In this way, a remaining value update may be easily carried out during the reconstruction of the spectrum with the aid of the mask matrix.

It may furthermore be advantageously provided that the mask matrix can have a value of "zero" at positions corresponding to the positions of disrupted sampling values in the discrete beat signal, and/or that the mask matrix has a value of "one" at positions corresponding to the positions of disruption-free sampling values in the discrete beat signal. In this way, a tracking of remaining value updates in the discrete beat signal may be easily facilitated with the aid of the mask matrix.

During the monitoring of remaining value updates, the remaining value updates may be advantageously tracked with the aid of the mask matrix at position of disruption-free sampling values in the discrete beat signal. In this way, the finding may be used that the number of remaining value updates is associated with or corresponds to the number of disruption-free sampling values in the discrete beat signal.

The size of the transmission function may be fixed during the reconstruction of the spectrum. This makes it possible to implement an, in particular, two-dimensional, inverse discrete Fourier transform, preferably an inverse fast Fourier transform, within the scope of the transmission function.

This makes it possible to implement an, in particular, two-dimensional, inverse discrete Fourier transform, preferably an inverse fast Fourier transform, within the scope of the transmission function when reconstructing the spectrum. In these ways, accelerators established for the radar sensor may be implemented for an FFT processing to increase the efficiency of the method and considerably reduce the processing time.

The transmission function may preferably be determined with the aid of an accelerator for an FFT processing. In this way, the efficiency may be increased during the reconstruction of the spectrum and the processing times significantly reduced.

It may also be provided that the reconstruction of the spectrum can be carried out with the aid of a solver for a compressed sensing. It is furthermore conceivable that an accelerator for an FFT processing may be implemented in the solver for the compressed sensing. In this way, the reconstruction of the spectrum may take place reliably and efficiently.

A method for compressed sensing may also be used during the reconstruction of the spectrum. The reconstruction of the spectrum may advantageously be carried out using an iterative gradient descent method. In this way, established approaches to reconstructing sparsely populated spectra may be used.

A method may advantageously be used for reconstructing the spectrum such as a basis pursuit reconstruction method, an iterative soft thresholding reconstruction method, an iterative hard thresholding reconstruction method, an orthogonal matching pursuit reconstruction method, an approximate message passing reconstruction method, an adaptive thresholding for compressed sensing reconstruction method, or a YALL1 reconstruction method, etc. The advantage is that the method which may be carried out as described above may be used with the aid of different techniques and methods for reconstructing the spectrum, and the efficiency as well as the computational complexity of these methods may be significantly improved.

It may furthermore be provided that, during the reconstruction of the spectrum, a spectrum can be determined as a reconstructed spectrum which is characterized by a remaining value update of the spectrum which drops below a certain threshold value. In this way, the reconstructed spectrum which corresponds with a high degree of accuracy to a spectrum without the inference disruptions may be determined during the update. With the aid of the remaining value updates, an iterative optimization method may be provided for determining the reconstructed method, for example, with the aid of an iterative gradient descent method.

According to a further advantage, the method, which may be carried out as described above, may result directly in an, in particular two-dimensional range-Doppler spectrum. This is based on the advantage that the vectorization of the beat signal is omitted when reconstructing the spectrum, and the two-dimensional, discrete, and preferably normalized beat signal is processed directly. The dimension of the transmission function may also be fixed thereby regardless of the type and position of the disruptions in the discrete beat signal, since they are easily and comfortably set to zero by the mask matrix in the uniformly dimensioned matrix of the beat signal. Due to the fixed dimension of the transmission function, an inverse discrete Fourier transform may thus also be implemented directly within the scope of the transmission function. In this way, the beat signal is not first reconstructed in order to be subsequently transformed into the range-Doppler spectrum, but instead the range-Doppler spectrum is reconstructed directly from the existing beat signal.

The invention furthermore provides a radar sensor for a vehicle, including: a transmitting unit for emitting a transmission signal, a receiving unit, in particular comprising three receiving antennas, for the purpose receiving a received signal, and an electronic unit, which is designed to carry out a method which may run as described above. With the aid of the radar sensor according to the invention, the same advantages may be achieved which were described in connection with the method according to the invention. In the present case, full reference is made to these advantages.

The invention additionally provides a computer program product, comprising commands, which, when the computer program product is executed by a computer, prompt the latter to carry out the method which may run as described above. With the aid of the computer program product according to the invention, the same advantages may be achieved which were described in connection with the method according to the invention. In the present case, full reference is made to these advantages.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
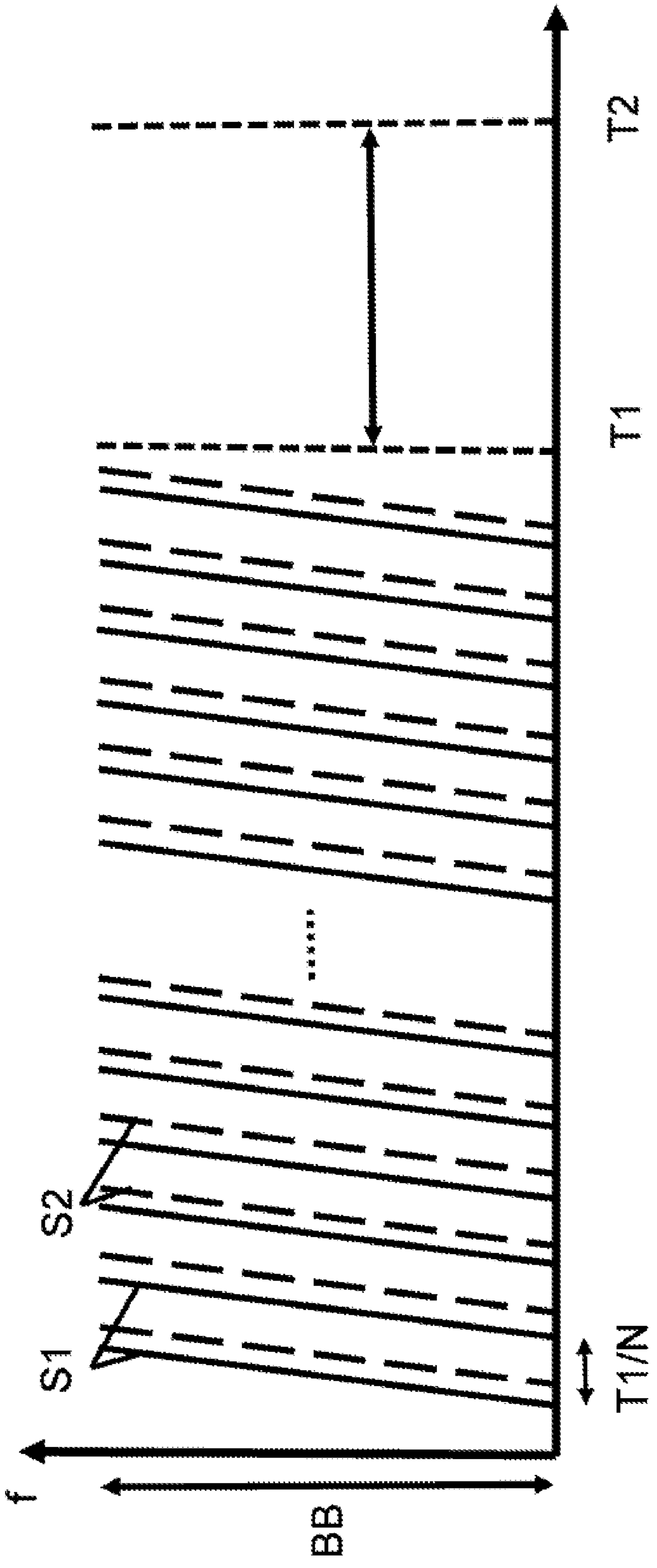
FIG. 1 shows an example of a transmission signal and an example of a received signal.

FIG. 1 shows a concept of a fast chirp sequence as a modulation diagram for a transmission signal S1 during a radar sensing, in particular for a radar sensor 200 (cf. FIG. 2) of a vehicle. The radar sensor used to determine the parameters of objects outside the vehicle, for example distance d, velocity v, and angle α (cf. FIG. 7). In each measurement cycle of this modulation diagram, radar sensor 200 sequentially transmits N frequency ramps, so-called chirps, within a time period T1 up to a point in time T1. The duration of a frequency ramp or a chirp is T1/N. The present transmission frequency f of the chirp is changed linearly within transmission bandwidth BB (linear frequency modulation). received signal S2 is generated by the at least partial reflection of the chirps on an object. The processing of the received signal data takes place after time period T1 within time range T2-T1. The entire measurement cycle duration extends up to a point in time T2.

Figure 2:
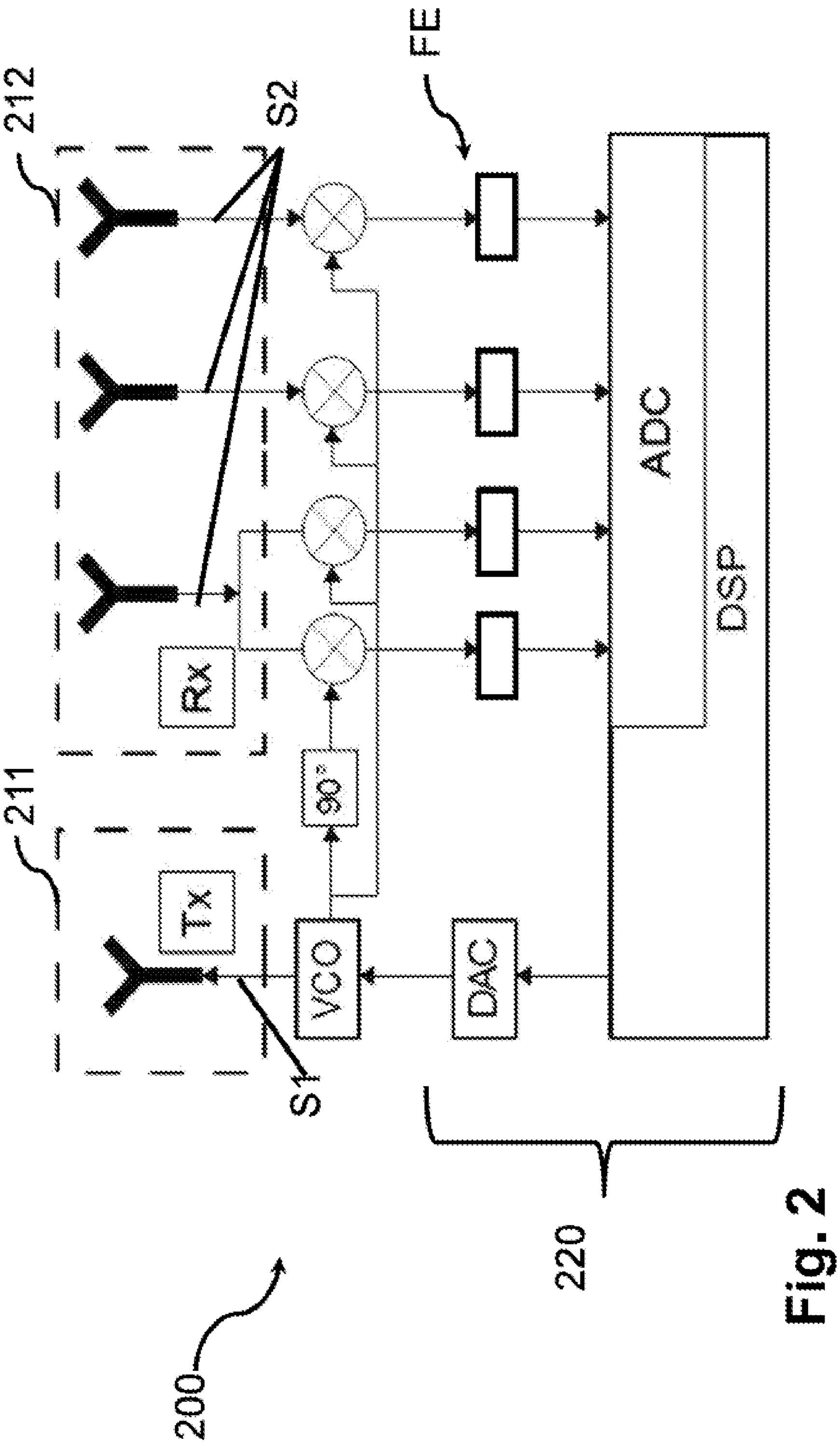
FIG. 2 shows a block diagram of a radar sensor.

FIG. 2 shows a radar sensor 200 within the meaning of the invention. Radar sensor 200 includes a transmitting unit 211 having at least one transmitting antenna Tx and a receiving unit 212, which has, for example, three receiving antennas Rx. Receiving antennas Rx may be preferably arranged equidistantly at a defined distance from each other. Transmission signal S1 is scattered back to radar sensor 200 from an object outside the vehicle. This reflected signal, or received signal S2, is first demodulated to a certain baseband, for example by a filter unit FE comprising, for example, at least one low-pass filter. A corresponding baseband signal is then sampled, in particular, by an analog/digital converter ADC.

Figure 3:
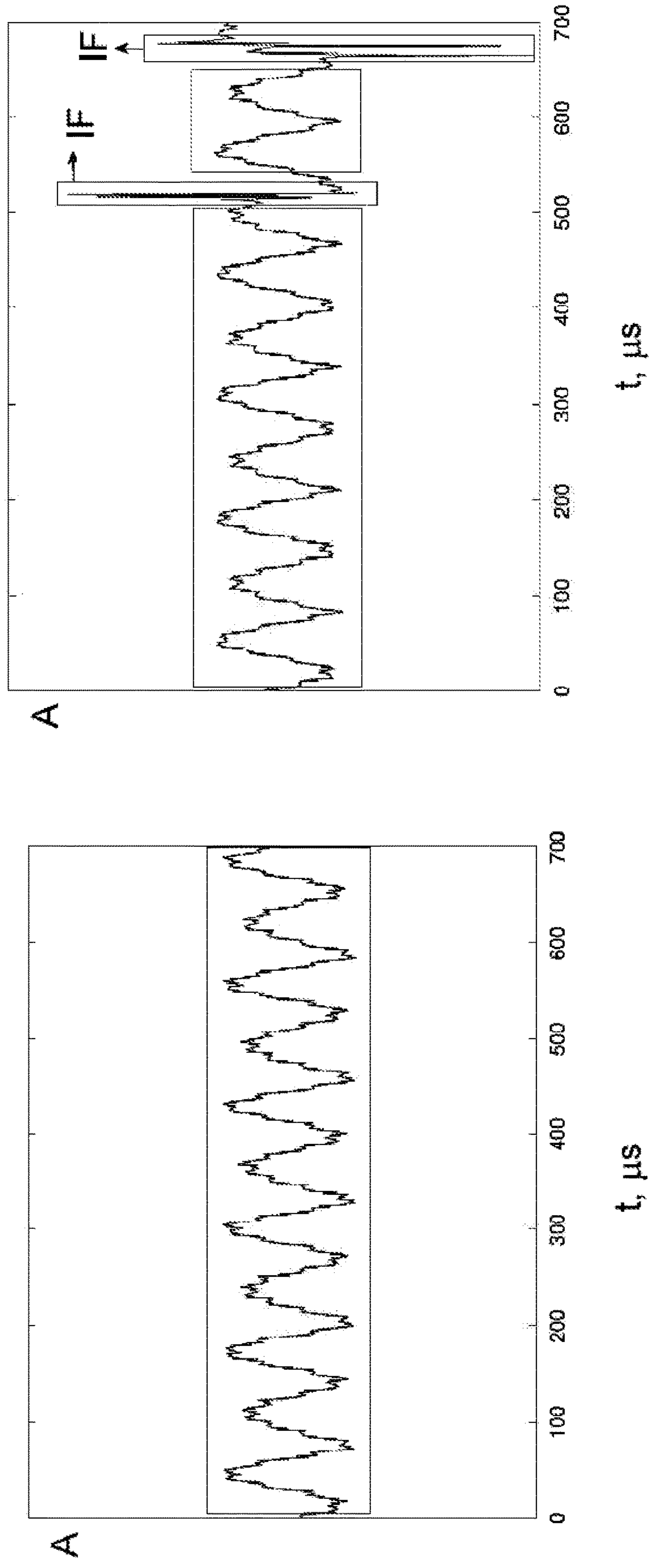
FIG. 3 shows an example of a discrete beat signal without interference and an example of a discrete beat signal with interference, per frequency ramp or per chirp in each case.

An example of a one-dimensional discrete beat signal per chirp without interference IF is shown on the left in FIG. 3. An example of a one-dimensional discrete beat signal per chirp with interference IF is shown on the right in FIG. 3. The signals shown in FIG. 3 are vibrations having an amplitude A as a function of time t.

The signals shown in FIG. 3 may be understood to be a vertical cut along a chirp, which is made by beat signal Y, which is shown on the left in FIG. 4, and which is described in detail below.

Up to point in time T1, the sampling values are stored in an M-N matrix, which has M sampling values per chirp and N chirps. In this way, a two-dimensional discrete and preferably normalized beat signal Y (so-called "2D discrete beat signal") is depicted within the meaning of the invention, which is shown, for example, on the left in FIG. 4.

Figure 4:
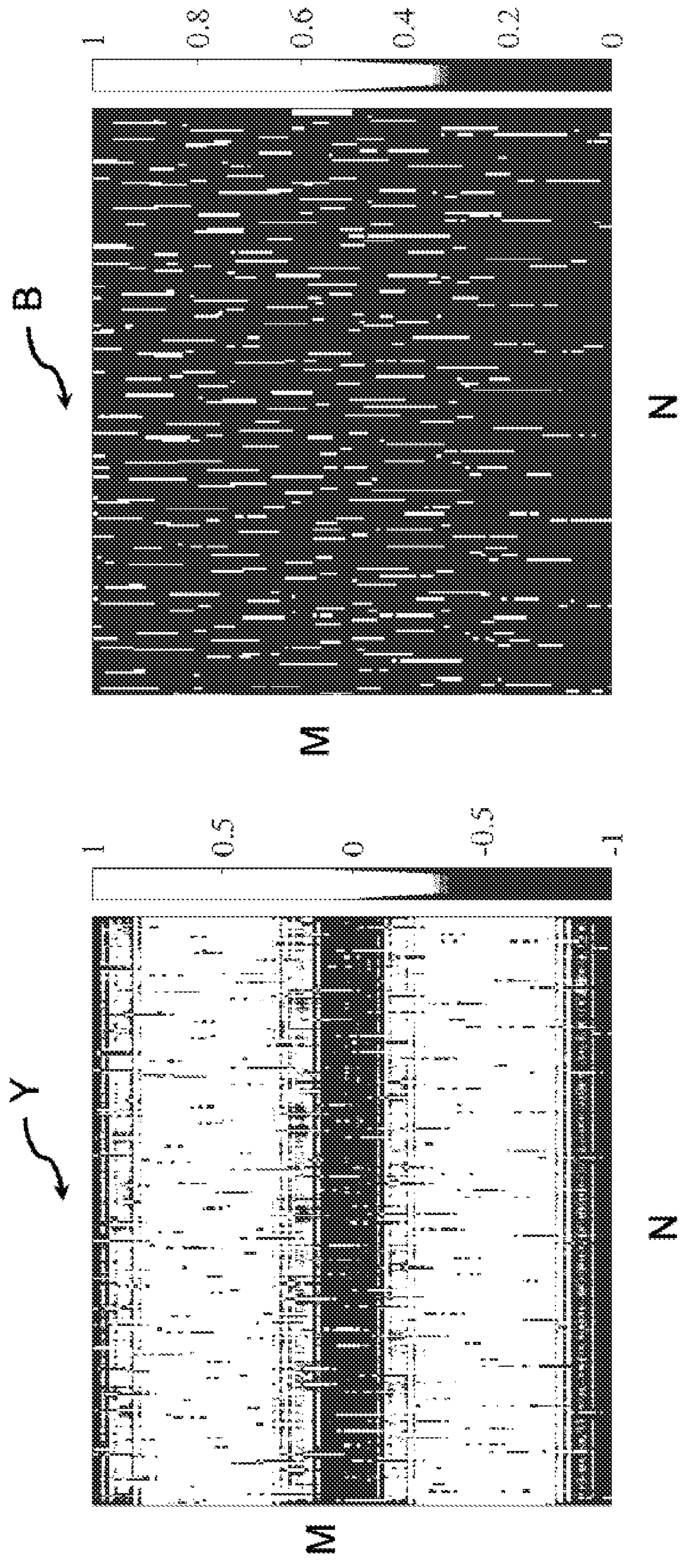
FIG. 4 shows an example of a two-dimensional discrete beat signal with interference, obtained with the aid of N frequency ramps or chirps and M sampling values per frequency ramp or per chirp.

The M-N matrix, including its entries in the form of sampling values of filtered received signal S2, which is illustrated on the left in FIG. 4, thus illustrated a two-dimensional discrete and preferably normalized beat signal Y within the meaning of the invention. The amplitude of discrete and preferably normalized beat signal Y is suggested by the sampling values indicated to the left of the signal with the aid of numbers −1 through 1. The sampling values may also be understood as elements of the two-dimensional M-N matrix.

Two dimensional, discrete, and preferably normalized beat signal Y, which is shown on the left in FIG. 4, is disrupted by interference IF. The disrupted sampling values of beat signal Y are indicated by irregular vertical lines.

An M-N matrix is shown on the right in FIG. 4, which has zero values at the positions corresponding to the disrupted sampling values of beat signal Y. This M-N matrix shown on the right in FIG. 4 may be obtained as a result of a detection of disrupted sampling values and a determination of the positions of detected disrupted sampling values in discrete beat signal Y.

When radar sensor 200 is used in a vehicle, the radar signals are often disrupted by interference with the radar signals of other vehicles. In the case of a radar sensing within the meaning of the invention, the disruptive influences are first detected and then processed to reconstruct a spectrum X, in particular a two-dimensional range-Doppler spectrum RD (cf. spectrum on the right in FIG. 7). The reconstruction of range-Doppler spectrum RD, which is shown as an example on the right in FIG. 7, preferably takes place directly from a discrete beat signal Y, which is shown as an example on the left in FIG. 4.

Figure 5:
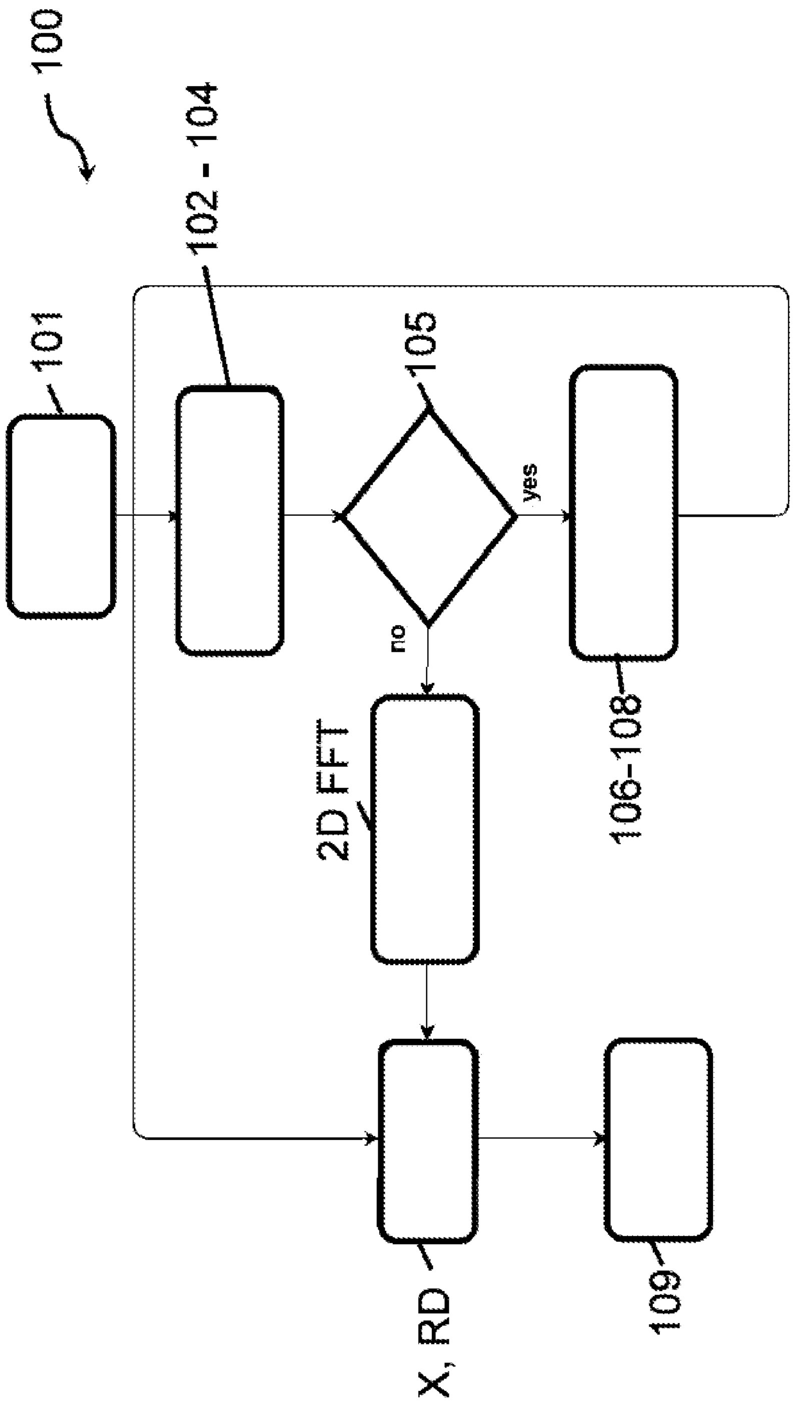
FIG. 5 shows an example of a sequence of a method within the meaning of the invention.

As clarified in FIG. 5, the method according to the invention includes the following steps:

101 Emitting a transmission signal S1, in particular, by a transmitting unit 211 of radar sensor 200, for example, comprising at least one transmitting antenna Tx. An example of a transmission signal S1 is illustrated schematically in FIG. 1. An example of a transmitting unit 211 is illustrated schematically in FIG. 2.

102 Receiving a received signal S2 which correlates to transmission signal S1, in particular by a receiving unit 212 of radar sensor 200, for example, comprising three, preferably equidistant, receiving antennas Rx. An example of a received signal S2 is illustrated schematically in FIG. 1. An example of a receiving unit 212 is illustrated schematically in FIG. 2.

103 Filtering received signal S2, in particular by a filter unit FE, for example comprising at least one low-pass filter, and sampling the filtered received signal S2, in particular by an analog/digital converter ADC of an electronic unit 220 of radar sensor 200. An example of filter unit FE and an example of analog/digital converter ADC are illustrated schematically in FIG. 2.

104 Determining an, in particular, two-dimensional, discrete, and preferably normalized beat signal Y, or a so-called "discrete beat signal," from filtered and sampled received signal S2, in particular by a digital processing device of the electronic unit of the radar sensor.

105 Detecting disrupted sampling values (cf. the white entries in the M-N matrix on the right in FIG. 4) in discrete beat signal Y (cf. the discrete signal on the left in FIG. 4), in particular by digital processing device DSP of electronic unit 220 of radar sensor 200. The detection of disrupted sampling values may also comprise the determination of the position of disrupted sampling values. The detection of disrupted sampling values may advantageously take place with the aid of a filter for edge detection in a combination with an iterative adaptive threshold value method, which results in improved results of the detection.

106 Generating an, in particular, binary mask matrix B (B={0, 1}, which comprises only zeros and ones and may represent a mathematical map of the M-N matrix on the right in FIG. 4) for marking disruption-free sampling values and for masking disrupted sampling values in discrete beat signal Y (cf. the discrete signal on the left in FIG. 4), in particular by digital processing unit DSP of electronic unit 220 of radar sensor 200. The marking may take place by inserting ones "1" at the positions in the M-N matrix which correspond to the positions of disruption-free sampling values in discrete beat signal Y. The masking may take place by inserting zeros "0" at the positions in the M-N matrix which correspond to the positions of disrupted sampling values in discrete beat signal Y.

Figure 6:
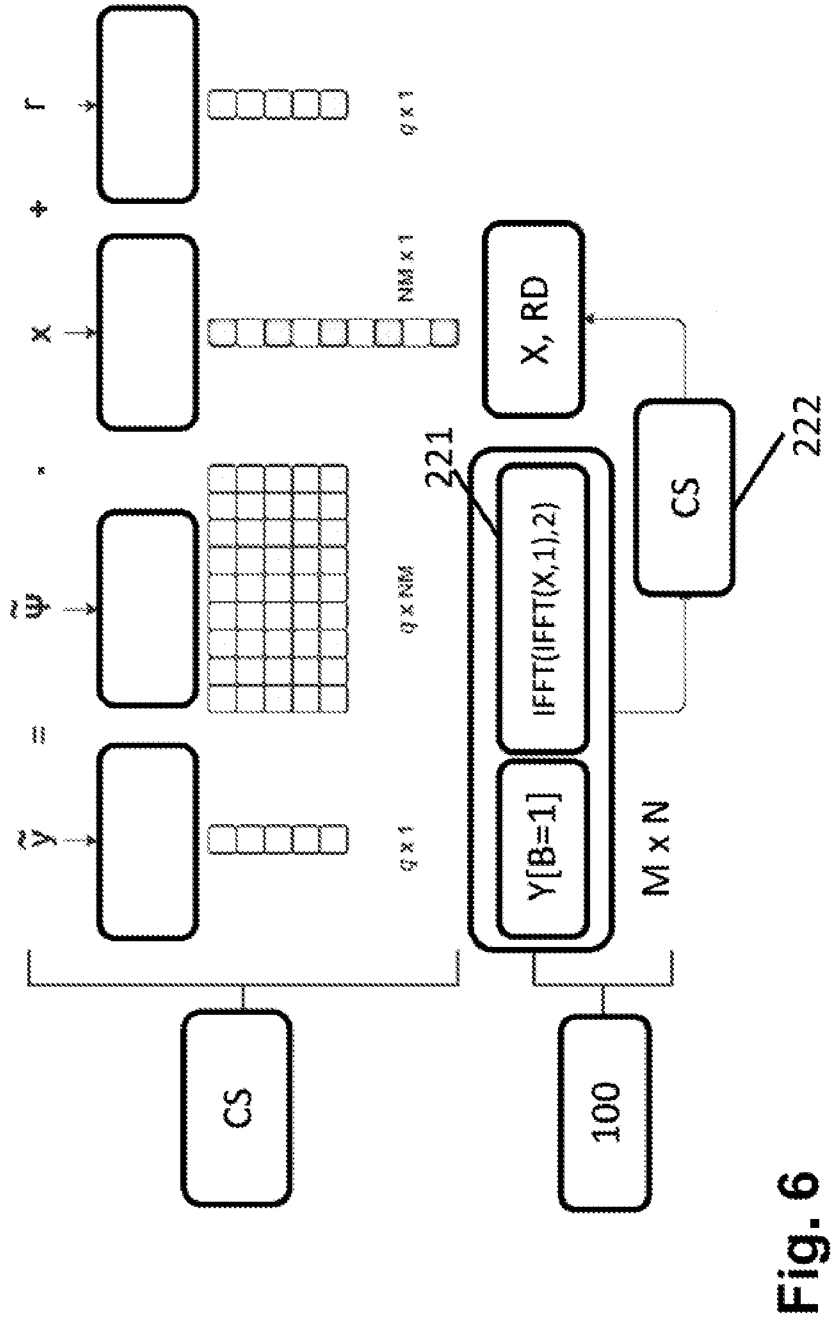
FIG. 6 shows a schematic illustration of a method for compressed sensing and the idea of the invention for implementation within the scope of the compressed sensing.

107 Reconstructing spectrum X from disruption-free sampling values of discrete beat signal Y with the aid of a transmission function ψ (Y=ψ*X), in particular by digital processing device DSP of electronic unit 220 of radar sensor 200. Transmission function ψ may be mapped, for example, in the form of a transformation matrix for transforming discrete beat signal Y into spectrum X. The reconstruction of spectrum X may preferably take place with the aid of a method for compressed sensing, as indicated above in FIG. 6.

108 Monitoring remaining value updates R during the reconstruction of spectrum X with the aid of mask matrix B, in particular by digital processing device DSP of electronic unit 220 of radar sensor 200. During the monitoring of remaining value updates R, remaining value updates R may be tracked with the aid of mask matrix B at positions of disruption-free sampling values in discrete beat signal Y, as indicated below in FIG. 6.

In a further step 109, the results of the reconstruction obtained with the aid of reconstructed spectrum X, for example distance d to the object and velocity v of the object or relative velocity to the object, may be used for different function systems of the vehicle, such as a parking aid, blind spot monitoring, adaptive cruise control, velocity control, etc.

Figure 7:
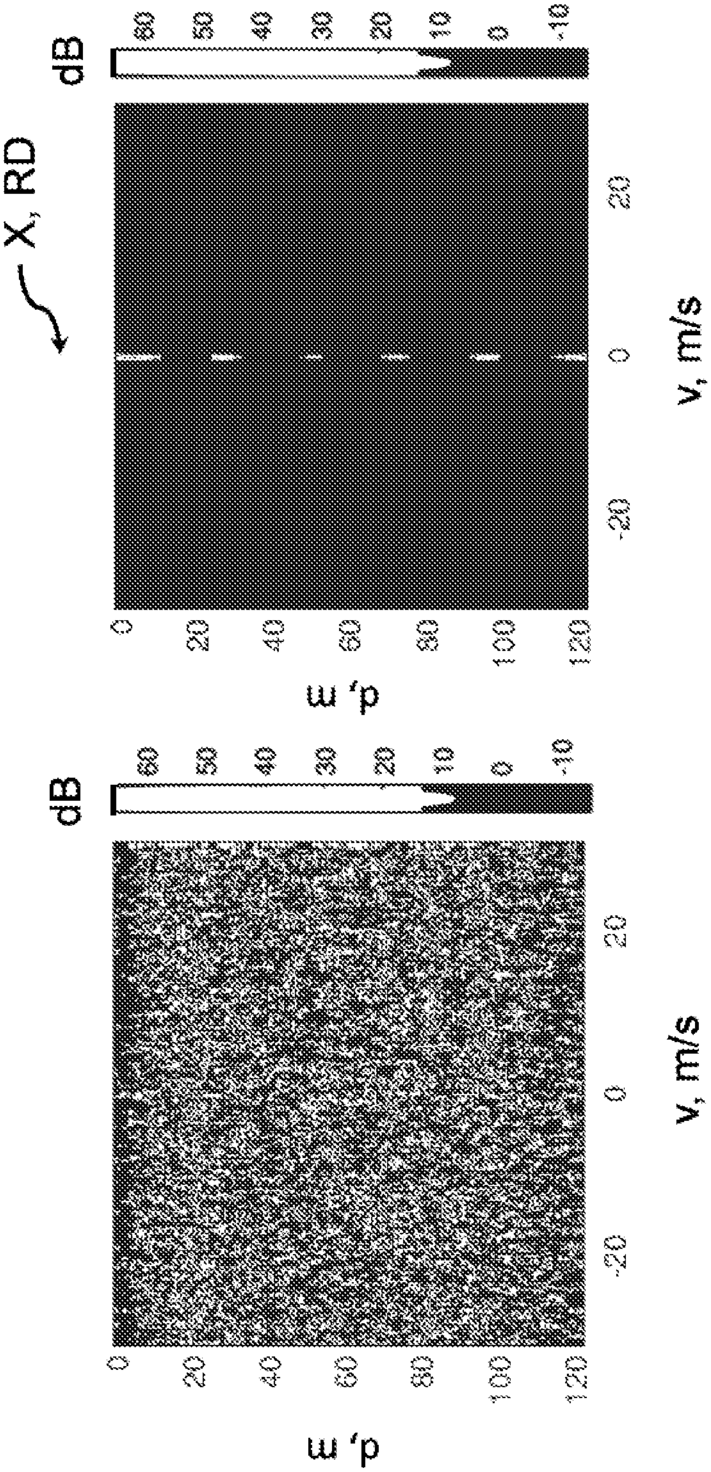
FIG. 7 shows an example of a two-dimensional spectrum without interference and an example of a two-dimensional spectrum with interference.

An example of a reconstructed spectrum X is shown on the right in FIG. 7.

A spectrum which would be calculated directly from disrupted discrete beat signal Y with the aid of a 2D FFT is shown on the left in FIG. 7. It is apparent that interference IF is superimposed on the calculated spectrum and the latter would be unusable for a radar sensing.

However, if no disrupted sampling values were to be detected in discrete beat signal Y in step 105, a 2D FFT could result in a spectrum X shown on the right in FIG. 7.

As indicated in FIG. 7, spectrum X may be at least two-dimensional, and/or at least one first dimension of spectrum X may be specific to a distance d to the object, and at least one second dimension of spectrum X may be specific to a velocity v of the object.

The invention may significantly improve the radar sensing in the field. With the aid of the invention, methods for compressed sensing may be simplified when mitigating interference disruptions. The method according to the invention may be referred to as a two-dimensional masked residual updating control method, a so-called 2D MRUC.

Due to the fact that beat signal Y, which is illustrated, for example, on the left in FIG. 4, has a reduced number of undisrupted sampling values, or that beat signal Y has a so-called sparse or thin population in the M-N matrix, a spectrum X, for example range-Doppler spectrum RD, may be reconstructed with the aid of disruption-free sampling values in beat signal Y. Methods for compressed sensing CS may be utilized for this purpose, in particular using an iterative gradient descent method.

$$r_t = \tilde{y} - \tilde{\Psi} x_t,$$

$$x_{t+1} = x_t + \tilde{\Psi}^T r_t.$$

The invention recognizes that the microcontrollers of most radar sensors are able to work with reduced latency periods via an accelerator for the FFT processing. However, the known methods for compressed sensing CS do not use this advantage, due to the necessary vectorization ỹ of beat signal Y.

To use this computational advantage of the FFT processing, the invention proposes a 2D masking in beat signal Y with the aid of a binary mask matrix B={0, 1} $N^{XM}$. In this way, the size of transmission function ψ may be fixed, which elegantly implements FFT processing within the scope of transmission function ψ (Y=ψ*X) and may be easily integrated into different known solvers 222 for a compressed sensing CS.

The advantage of a fixed size of measurement transformation matrix Y is thus that the matrix vector multiplications for the Fourier transforms may be replaced by the FFT processing or inverse FFT processing IFFT. If IFFT (X; 1) describes inverse fast Fourier transform IFFT along the first dimension, and IFFT (X; 2) describes inverse fast Fourier transform IFFT along the second dimension, the 2D IFFT transformation may be expressed as follows within the range of the Doppler spectrum:

$$Y = IFFT(IFFT(X, 1), 2).$$

As described above in FIG. 6, however, size q×NM of transmission function ψ in the known methods for compressed sensing CS depends on the number of interference-free or undisrupted sampling values in beat signal Y, which may vary in different interference scenarios.

The invention also recognizes that dimension q of remaining value updates R corresponds to the number of disruption-free sampling values in beat signal Y. The invention therefore proposes to monitor remaining value updates R using mask matrix B and to simultaneously fix the size of transmission function ψ or of the transformation matrix. In other words, the invention proposes to track remaining value updates R with the aid of mask matrix B=$\{0, 1\}^{N\times M}$ at the positions of disruption-free sampling values in beat signal Y.

Map Y [B=1] describes the selection of all elements in matrix Y whose position in B have a value of "one" or "1." The notation $$Y[B = 1] \xrightarrow{p \cdot M} \tilde{Y}$$

maps a matrix Ỹ, which comprises p disruption-free sampling values from M columns in beat signal Y. Correspondingly, the notation $$Z[B = 1] \xleftarrow{p \cdot M} \tilde{Y}$$

may be used to indicate the mapping of the elements from M columns in the matrix Ỹ to the positions in a zero matrix Z, whose positions in B have the value 1.

Compressed sensing CS may be adapted as follows with the aid of the method according to the invention:

$$R_t = \tilde{Y} - \left(Y_{rec}[B = 1] \xrightarrow{p \cdot M} Y_t\right),$$

$$X_{t+1} = \tau_\lambda(X_t + \vartheta \cdot FFT(FFT(R_{rec}, 1)2)),$$

$$\text{where } Y_{rec} = IFFT(IFFT(X_t, 1), 2) \text{ and}$$

$$R_{rec} = Z[B = 1] \xleftarrow{p \cdot M} R_t.$$

Various classic methods for compressed sensing CS may be advantageously improved with the aid of the method according to the invention, for example base tracking, iterative threshold value formation, orthogonal matching pursuit OMP, approximate message passing AMP, etc.

The method within the scope of the invention is able to reconstruct spectrum X with a higher degree of accuracy, higher efficiency, and higher speed in fractions of a millisecond. The method furthermore shows considerable advantages with respect to reduced calculation complexity.

It may furthermore be provided that, during the reconstruction of spectrum X, a spectrum Xj is determined as a reconstructed spectrum, which is characterized by a remaining value update Rj of spectrum Xj, which drops below a certain threshold value:

$(\|R_j\|_F - \|R_{j-1}\|_F)/\|R_j\|_F < \varepsilon$, where the operator ||°|| designates the Frobenius norm.

As is also clarified in FIG. 5, the method, which may run as described above, may result directly in an at least two-dimensional range-Doppler spectrum (RD), which is illustrated, for example, on the right in FIG. 7.

It is furthermore conceivable that the edge detection in step 105 may be carried out with the aid of an operator for edge detection, or example a Laplace filter or Laplace operator.

The Laplace filter in two dimensions may be mapped in Cartesian coordinates as follows:

$$\Delta f = \frac{\partial^2 f}{\partial x^2} - \frac{\partial^2 f}{\partial y^2}.$$

It is additionally conceivable that the threshold value formation in step 105 may be carried out with the aid of an iterative adaptive threshold value method.

The disruptive sampling values may first be detected with the aid of threshold value $r_{th}$.

$$r_{th} = \gamma\left(\frac{1}{L}\sum_{l=1}^{L}|y_l|\right),$$

where L=M*N.

The detected sampling values are subsequently set to "zero" in beat signal Y. A new threshold value may then be calculated using the number of detected sampling values D.

$$r_{th} = \gamma\left(\frac{1}{L-D}\sum_{l=1}^{L}|y_l|\right),$$

or $$r_{th} = \gamma\left(\sqrt{\frac{1}{L-D}\sum_{l=1}^{L}y_l^2}\right).$$

Since the detection of disruptions and the position thereof may be very accurately carried out with the aid of combined detection 105, this, in turn, may result in significantly improved results in the signal reconstruction in terms of the method according to the invention. During the signal reconstruction, in particular with the aid of methods for compressed sensing CS, the number of the correctly detected disruptive positions has an essential influence on the reconstruction results. If a small number of disruption-free samples is inadvertently discarded, this results in a small change in the compression result and does not have a major influence on the reconstruction results. The evaluation results of two-step detection 105 show that two-step detection 105 may correctly detect approximately 96% of the interference-contaminated sampling values. Two-step detection 105 is thus suitable in an improved manner for the signal reconstruction using methods of compressed sensing CS. The undetected 4% of the interference-contaminated samples may have only low amplitudes, since they would otherwise have been detected by iterative adaptive threshold value method D2. These distorted sampling values may therefore also generate little additional noise in the frequency range.

The above explanation of the figures describes the present invention exclusively within the scope of examples. Individual features of the specific embodiments may, of course, be freely combined with each other if technically reasonable, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to reconstruct a spectrum from a signal of a radar sensor disrupted by interference for a vehicle, the method comprising:
- emitting a transmission signal;
- receiving a received signal that correlates to the transmission signal;
- filtering and sampling the received signal;
- determining a discrete beat signal from the filtered and sampled received signal;
- detecting disrupted sampling values in the discrete beat signal;
- generating a binary mask matrix for marking disruption-free sampling values and for masking the disrupted sampling values in the discrete beat signal;
- reconstructing the spectrum from the disruption-free sampling values of the discrete beat signal with the aid of a transmission function; and
- monitoring remaining value updates of the disruption-free sampling values of the discrete beat signal during the reconstruction of the spectrum with the aid of the binary mask matrix,
- wherein a two-dimensional masked residual updating control method (2D MRUC) for compressed sensing is used during the reconstruction of the spectrum.

2. The method according to claim 1, wherein the emission of the transmission signal takes place with the aid of multiple frequency ramps within a time period or a transmission frequency of the frequency ramps being modulated.

3. The method according to claim 1, wherein the received signal is specific to a distance to an object outside the vehicle, on which the transmission signal is at least partially reflected.

4. The method according to claim 3, wherein the spectrum is at least two-dimensional, and/or wherein at least one first dimension of the spectrum is specific to a distance to the object, and at least one second dimension of the spectrum is specific to a velocity of the object.

5. The method according to claim 1, wherein the discrete beat signal is at least two-dimensional, and/or wherein at least one first dimension of the discrete beat signal is determined by a number of the disruption-free and the disrupted sampling values for each frequency ramp in the transmission signal, and wherein at least one second dimension of the discrete beat signal is determined by a number of ramps in the transmission signal.

6. The method according to claim 1, wherein the detection of disrupted sampling values in the discrete beat signal takes place with the aid of a filter for detecting edges and an iterative adaptive threshold value method.

7. The method according to claim 1, wherein the binary mask matrix is two-dimensional, and/or the dimension of the binary mask matrix is determined according to the dimension of the discrete beat signal in matrix form.

8. The method according to claim 1, wherein the binary mask matrix has a value of "zero" at positions corresponding to the positions of the disrupted sampling values in the discrete beat signal, and/or the binary mask matrix has a value of "one" at positions corresponding to the positions of the disruption-free sampling values in the discrete beat signal.

9. The method according to claim 1, wherein, during the monitoring of the remaining value updates, the remaining value updates are tracked with the aid of the binary mask matrix at positions of the disruption-free sampling values in the discrete beat signal.

10. The method according to claim 1, wherein a size of the transmission function is fixed during the reconstruction of the spectrum.

11. The method according to claim 1, wherein a two-dimensional, inverse discrete Fourier transform or an inverse fast Fourier transform is used within the scope of the transmission function when reconstructing the spectrum.

12. The method according to claim 1, wherein the transmission function is determined with the aid of an accelerator for a fast Fourier transform (FFT) processing.

13. The method according to claim 1, wherein the reconstruction of the spectrum is carried out with the aid of a solver for the compressed sensing or an accelerator is implemented for a fast Fourier transform (FFT) processing in the solver for the compressed sensing.

14. The method according to claim 1, wherein the reconstruction of the spectrum is additionally carried out using an iterative gradient descent method.

15. The method according to claim 1, wherein the method further comprises one of: a basis pursuit reconstruction method, an iterative soft thresholding reconstruction method, an iterative hard thresholding reconstruction method, an orthogonal matching pursuit reconstruction method, an approximate message passing reconstruction method, an iterative method with adaptive thresholding for compressed sensing (IMATCS), or a your algorithms for Y1 (YALL 1) reconstruction method.

16. The method according to claim 1, wherein, during the reconstruction of the spectrum, the spectrum is determined as a reconstructed spectrum which comprises a remaining value update of the spectrum which drops below a certain threshold value.

17. The method according to claim 1, wherein the spectrum that is reconstructed is a two-dimensional range-Doppler spectrum.

18. A radar sensor for a vehicle, the radar sensor comprising:

a transmitter for emitting a transmission signal;

a receiver comprising three receiving antennas for receiving a received signal; and an electronic unit that is configured to carry out the method according to claim 1.

19. A non-transitory computer-readable medium storing a computer program thereon that, when the computer program is executed by a computer, causes the computer to carry out the method according to claim 1.

* * * * *